Sept. 8, 1936.  J. B. WHITTED  2,053,860
WINDSHIELD WIPER CONTROL CLUTCH
Filed Oct. 9, 1933
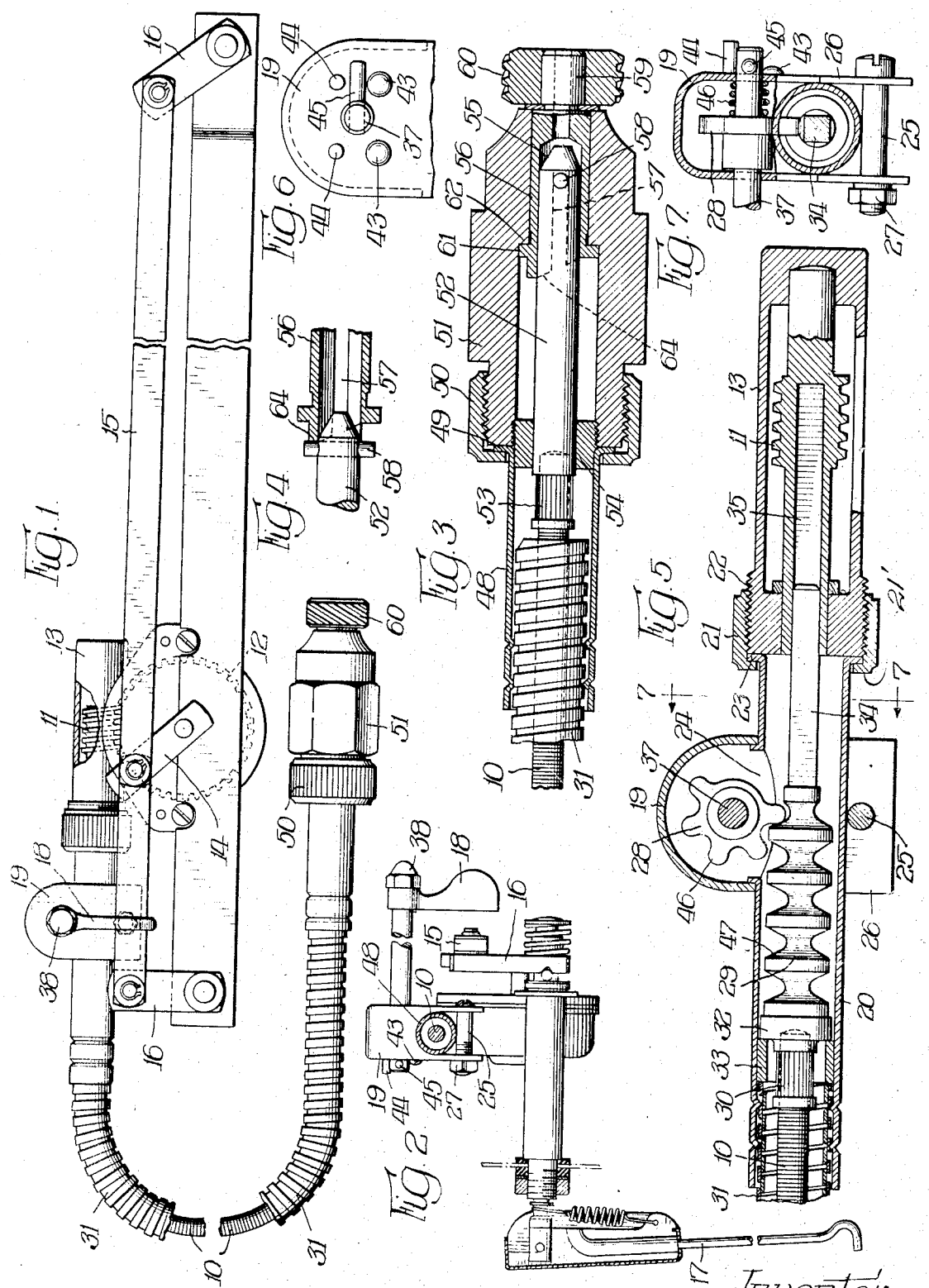
Inventor:
John B. Whitted,
By Wilkinson Huxley Byron & Knight
attys.

Patented Sept. 8, 1936

2,053,860

UNITED STATES PATENT OFFICE 2,053,860

WINDSHIELD WIPER CONTROL CLUTCH

John B. Whitted, Evanston, Ill., assignor to Stewart-Warner Corporation, Chicago, Ill., a corporation of Virginia Application October 9, 1933, Serial No. 692,911

6 Claims. (Cl. 192—82)

My invention relates to windshield wipers. More specifically, it relates to a clutch control for windshield wipers of the mechanically operated type.

In a mechanical windshield wiper the power to operate the wiper is ordinarily obtained from some moving part of the main engine of the automobile, by means of a flexible shaft. In order to provide means for turning the windshield wiper on and off, it has been customary to provide a clutch at the lower end of the flexible shaft, adjacent the main engine. The clutch is placed in this position in order that when it is not desired to operate the windshield wiper, the core of the flexible shaft will not be rotated.

To control the operation of the clutch, it has been a common practice to provide a Bowden wire, bringing the end of the wire into a position for operation adjacent the driver's seat. A better way of providing for the control of this clutch is to move the core of the flexible shaft longitudinally within its sheath by some manual means provided at the upper end of the flexible shaft.

Usually, to provide this manual means, some sort of yoke has been fitted over the upper end of the core and connections have been made to move this yoke by a handle. In practical application this method has involved the use of a considerable number of parts, rendering the structure expensive to manufacture and likely to break or otherwise become inoperative. Moreover, the structures of this kind, which have been used in the past, have usually had their manual control means mounted within the windshield wiper mechanism itself and this has meant that the connection of the flexible shaft to the operating mechanism has been difficult to make in order that the proper relations between the core, the clutch and the manual control mechanism might be correct.

The object of my invention is to provide improved manual means for moving the core of the flexible shaft longitudinally within its sheath.

Another object of my invention is to provide a means for a control clutch for a windshield wiper which employs a core movable longitudinally within its sheath, which mechanism may be constructed as part of the flexible shaft assembly, and may be easily attached to the main engine and to the operating mechanism at the windshield wiper.

Still another object of my invention is to provide manual means for effecting a longitudinal movement of a core within a flexible shaft, which is simple and of few parts.

And, it is my purpose to accomplish these objects by a device which is compact, neat, and of pleasing appearance.

In general, I accomplish my purposes by providing two ferrules at the ends of the flexible shaft. One of these is adapted for easy connection to the driving part of the clutch mechanism adjacent the engine and the other contains the very compact manual operating mechanism of my invention and is adapted for easy attachment to the driving mechanism of the windshield wiper. The manual operating mechanism consists of a pinion and a rack, but the rack revolves and is made as part of the shaft at the upper end of the core of the flexible shaft, thus eliminating extra parts and the need of a yoke connection to the core of the flexible shaft.

A more thorough understanding of my invention may be had by one skilled in the art by reference to the drawing made a part of this application.

Figure 1 is an assembly view showing the driving mechanism for the windshield wiper;

Figure 2 is an elevation partially in section illustrating the mounting of a wiper arm with respect to the driving mechanism;

Figure 3 is a sectional view illustrating the driving means and clutch control at one end of the flexible shaft;

Figure 4 is a detail sectional view illustrating the inoperative positions of the clutch members;

Figure 5 is an enlarged sectional view illustrating the manual control at the other end of the flexible shaft;

Figure 6 is a detail rear elevation of the housing for the manual control means, and Figure 7 is a detail section taken on the plane indicated 7—7 in Figure 5.

Referring to Figure 1, the flexible drive shaft 10 is driven, as will be later described, from the timer shaft of the engine. The shaft 10 drives a worm gear 11 which, in turn, operates the driven gear 12. The gears 11 and 12 are located in suitable gear box 13. The driven gear 12 operates a crank 14 which connects through pitmen 15 to the slightly lower cranks 16 which operate the windshield wiper arms 17. When it is in operation, this mechanism imparts an oscillating movement to the wiper arms which move squeegee wipers over the windshield. However, my invention is concerned not with this mechanism, which is more particularly disclosed and claimed in my application, Serial No. 692,588, filed October 7, 1933, but rather with the control means for turning it on and off.

The manual control handle 18, shown in Figure 1, is operative to move the flexible shaft 10 longitudinally and to connect or disconnect a clutch adjacent the connection of the flexible shaft to the engine.

In Figure 5, the details of the construction of the manual control mechanism are shown. As an enclosure for the moving parts, I have mounted a hollow cylindrical ferrule 20 adjacent the gear box 13 by means of a sleeve 21, which screws onto a threaded neck 22 of the gear housing. This sleeve has an inwardly turned flange 21' which engages a flange 23 spun on the end of the ferrule and thus holds the ferrule tightly against the gear box. This ferrule is provided with a rectangular opening 24 over which a stamped semi-cylindrical housing 19 is fastened by a bolt 25 passed through straps 26 hanging downwardly from the housing and secured by a nut 27. By this mounting of the housing, it may be turned on the ferrule to some extent by loosening the nut 27 on the bolt 25. This turning is desirable in order to make slight adjustments to allow the shaft for the operating handle to pass through an opening provided for it, (but often not accurately placed) in the body of the automobile.

Operating within the enclosure, formed by the ferrule and the housing, are a mutilated pinion 28 and a rotary rack member 29. The rotary rack member is made as an integral part of a solid shaft which heads the flexible shaft by forming a series of grooves suitable to receive the teeth of a pinion. The solid shaft receives its rotary motion from the core 10 of the flexible shaft and attachment to the core is made by passing the end of the core into a drilled out projecting end 30 of the rack member and crimping the two together. The sheath 31 of the flexible shaft extends into the ferrule 20 where it is fastened by crimping the ferrule around it.

As a bearing for the rack member, a collar 32, integral with the rack member is provided. This collar serves also to prevent excessive longitudinal movement of the rack member by abutment against a bushing 33 which is forced into the ferrule. The other end of the rack member is supported by the sliding engagement of a square sectioned projection 34 with a square section 35 of the worm gear shaft of the operating mechanism.

To move the rack member longitudinally the mutilated pinion 28 is pressed tightly upon an operating shaft 37 which projects through both sides of the housing 19. The operating handle 18 is keyed to one end of the shaft 37 and secured by nut 38.

As shown in Figures 6 and 7, a stop and latching mechanism is provided at the other end of the shaft by two round headed nubs 43, two stop pins 44 and an engaging pin 45. The nubs and the stop pins are fixed in position by being staked or simply pressed into tight-fitting holes in the face of the housing 19. The shaft, bearing the pin 45, is fixed at one end of the shaft to the exterior of the housing 19. Within the housing 19 the shaft 37 together with the gear 28 is urged in one direction by the coil compression spring 46. When the shaft is turned by the handle 18 into either of its two positions, the engaging pin will cam against the round headed nub against the pressure of the coiled spring until it snaps over the nub. In that position it will stop against the stop pin and will remain until the handle is turned in the reverse direction.

The mutilated pinion 28 is provided with teeth 46 to engage the teeth 47 of the rotary rack and it will be apparent, that, as the handle is turned, the pinion, engaging the rack member, will cause it to move longitudinally. The rack member remains in operative engagement with the worm gear 11 of the operating mechanism by reason of the sliding, cooperative, square sectioned connection between the two, but, as it moves, it draws with it the core of the flexible shaft.

The longitudinal movement of this core operates the clutch mechanism which is located at the remote end of the flexible shaft. This mechanism is shown in Figures 3 and 4. The sheath 31 of the flexible shaft terminates in a ferrule 48 which is crimped on to the sheath and the flange, as at 49, for attachment by a nut 50 to the clutch casing 51. Within the ferrule 48 the flexible core 10 is attached to a driven clutch member 52 which is formed with a recessed end 53 crimped securely over the core 10.

This shaft 52 is supported by a bushing 54 which serves as a bearing and which is screwed into the clutch casing 51. The shaft terminates in a tapered end 55 which serves to guide the shaft into engagement with a driving sleeve 56. This driving sleeve has a slot 57 to engage a transverse pin 58 in the driven shaft and terminates in a shaft portion 59, which projects through the casing 51, and bears a driven gear 60. This gear is in mesh with a suitable gear provided on the shaft of the main engine timer, and is fixed to the shaft portion 59 by a press fit. As a thrust bearing, a shoulder 61 is formed integrally with the driving sleeve and bears against a shoulder 62 formed in the clutch casing 51. To aid the engagement of the transverse pin 58 with the slot 57 of the driving sleeve, I have provided two ratchet-like faces 64 by cutting away portions of the sides of the sleeve.

In operation, when the core is drawn away from the clutch, the driving sleeve revolves without transmitting any motion to the core. But, when the manual operating mechanism is actuated to thrust the core towards the clutch mechanism, the transverse pin of the driven shaft first engages the ratchet faces of the driving sleeve, and then passes downwardly into the slot, so that the motion of the sleeve is transmitted to the transverse pin, causing the shaft to revolve and actuate the operating mechanism of the windshield wiper. To declutch, the manual operating mechanism is turned in the opposite direction, withdrawing the core and drawing the pin out of engagement with the slot of the driving sleeve.

I do not, of course, intend to limit myself to the specific preferred embodiment of my invention I have here described.

1. A flexible drive assembly for windshield wipers comprising, a flexible sheath, a drive transmitting flexible core in said sheath, ferrules fixed to the ends of said sheath, a clutch casing detachably connected to one of said ferrules, a driving clutch member extending into said casing, a driven clutch member in said casing connected to one end of said core, a detachable connection between the other of said ferrules and a driven mechanism, a drive transmitting rotatable rack within said last-mentioned ferrule and there connected to the other end of said core, and manually operable means engaging said rack for producing longitudinal displacement of said core to control the coupling between said clutch members.

2. A flexible drive assembly for windshield wipers comprising, a flexible sheath, a drive transmitting flexible core in said sheath, ferrules fixed to the ends of said sheath, a clutch casing detachably connected to one of said ferrules, a driving clutch member extending into said casing, a driven clutch member in said casing connected to one end of said core, one of said clutch members having a slot therein and the other of said clutch members having a pin adapted to enter said slot, a detachable connection between the other of said ferrules and a driven mechanism, a drive transmitting rotatable rack within said last-mentioned ferrule and there connected to the other end of said core and manually operable means engaging said rack for producing longitudinal displacement of said core in either direction to control the coupling between said clutch members, said manually operable means being detachably mounted on the ferrule containing the rotatable rack.

3. In a flexible drive assembly for windshield wipers, a flexible sheath, a flexible core in said sheath, a pair of clutch members, one of which is connected to an end of said core, a drive transmitting member connected to the opposite end of said core, said member having rack teeth formed thereon, a gear mounted to engage said teeth and manually operable means to rotate said gear to produce positive longitudinal displacement of said core in either direction and to control the coupling between said clutch members.

4. In a flexible drive assembly for windshield wipers, a flexible sheath, a flexible core in said sheath, a ferrule fixed to one end of said sheath, a detachable connection between said ferrule and a driven mechanism, a housing detachably mounted on said ferrule, a rack secured to the core, a gear in said housing in meshing engagement with said rack and a manually operable shaft for rotating said gear to produce positive longitudinal displacement of said core in either direction with respect to said sheath and yieldable means for locking said gear and shaft at the limits of movement thereof.

5. In a flexible mechanical drive for windshield wipers, a flexible sheath, a flexible core in said sheath, clutch members through which one end of said core is driven, a drive transmitting member at the other end of said core adapted to detachably engage a driven member, said drive transmitting member being formed with annular rack teeth, a rotatable gear mounted to engage said rack teeth and means for rotating said gear to produce positive longitudinal displacement of said core in either direction and control the coupling between said clutch members.

6. In a flexible mechanical drive for windshield wipers, a flexible sheath, a flexible core in said sheath, means through which said core is driven, a pair of clutch members between said core and driving means, a drive transmitting member comprising a rotatable rack at the other end of said core, a housing fixed with respect to said sheath, a gear rotatably mounted in said housing in meshing engagement with said rack, a manually operable shaft through which said gear is rotated to produce positive longitudinal displacement of said core in either direction and to control the engagement between said clutch members and yieldable locking means for holding said shaft and gear at the limits of movement thereof.

JOHN B. WHITTED.